(12) United States Patent
Wang He

(10) Patent No.: US 8,985,831 B2
(45) Date of Patent: Mar. 24, 2015

(54) LIGHT GUIDE PLATE HAVING UNIFORM LIGHT EMISSION AND MANUFACTURING METHOD THEREOF

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 43 days.

(21) Appl. No.: 13/865,111

(22) Filed: Apr. 17, 2013

(65) Prior Publication Data
US 2014/0177269 A1   Jun. 26, 2014

(30) Foreign Application Priority Data
Dec. 26, 2012   (TW) .............................. 101150010 A

(51) Int. Cl.
F21V 7/04   (2006.01)
F21V 8/00   (2006.01)

(52) U.S. Cl.
CPC ............ *G02B 6/0036* (2013.01); *G02B 6/0065* (2013.01)
USPC ........... 362/619; 362/600; 362/606; 362/627; 445/13

(58) Field of Classification Search
USPC ................. 362/600, 606–610, 615, 617–619, 362/623–625, 627–629; 428/39, 103–104, 428/141–142, 304.4, 317.1, 317.3, 323, 428/357, 402, 403–407; 445/9–14, 58
See application file for complete search history.

(56) References Cited

U.S. PATENT DOCUMENTS

| | | | | |
|---|---|---|---|---|
| 3,893,748 A * | 7/1975 | De Palma et al. | ............. | 359/455 |
| 4,456,336 A * | 6/1984 | Chung et al. | ................... | 349/160 |
| 4,664,748 A * | 5/1987 | Ueno et al. | ........................ | 216/51 |
| 5,245,248 A * | 9/1993 | Chan et al. | ..................... | 313/309 |
| 6,827,456 B2 * | 12/2004 | Parker et al. | .................. | 362/629 |
| 7,246,933 B2 * | 7/2007 | Kunimochi | ................... | 362/620 |
| 7,344,282 B2 * | 3/2008 | Kim et al. | ...................... | 362/335 |
| 7,452,119 B2 * | 11/2008 | Onishi et al. | .................. | 362/620 |
| 7,736,046 B2 * | 6/2010 | Kim et al. | ...................... | 362/617 |
| 8,580,372 B2 * | 11/2013 | Wu et al. | ....................... | 428/156 |
| 8,692,962 B2 * | 4/2014 | Shibata et al. | ................ | 349/112 |
| 2004/0120139 A1 * | 6/2004 | Kunimochi et al. | ............ | 362/31 |
| 2007/0279940 A1 * | 12/2007 | Kim et al. | ...................... | 362/617 |
| 2008/0088933 A1 * | 4/2008 | Lin | ............................... | 359/599 |
| 2011/0163066 A1 * | 7/2011 | Choi et al. | ....................... | 216/36 |
| 2013/0322114 A1 * | 12/2013 | Nishitani et al. | .............. | 362/606 |

* cited by examiner

*Primary Examiner* — Anne Hines
*Assistant Examiner* — Jose M Diaz
(74) *Attorney, Agent, or Firm* — Novak Druce Connolly Bove + Quigg LLP

(57) ABSTRACT

A light guide plate includes a main body and a number of micro protrusions. The main body includes a light emitting surface, a bottom surface, and a light incident surface. The bottom surface is opposite to the light emitting surface. The light incident surface connects the light emitting surface and the bottom surface. The protrusions are randomly positioned on the light emitting surface, and are used for reflecting light rays towards random directions.

11 Claims, 3 Drawing Sheets

LIGHT GUIDE PLATE HAVING UNIFORM LIGHT EMISSION AND MANUFACTURING METHOD THEREOF

BACKGROUND

1. Technical Field

The present disclosure relates to a light guide plate having uniform light emission and a method of manufacturing the light guide plate.

2. Description of Related Art

A light guide plate usually distributes a number of microstructures. However, the microstructures are arranged in order, and thus light rays transmitted in the light guide plate can be reflected by the microstructures towards a same direction, and a portion of the light emitting surface emits more light rays, and the other portion of the light emitting surface emits less light rays. The overall brightness of the light emitting surface is not uniform.

Therefore, it is desirable to provide a light guide plate and a manufacturing method thereof that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
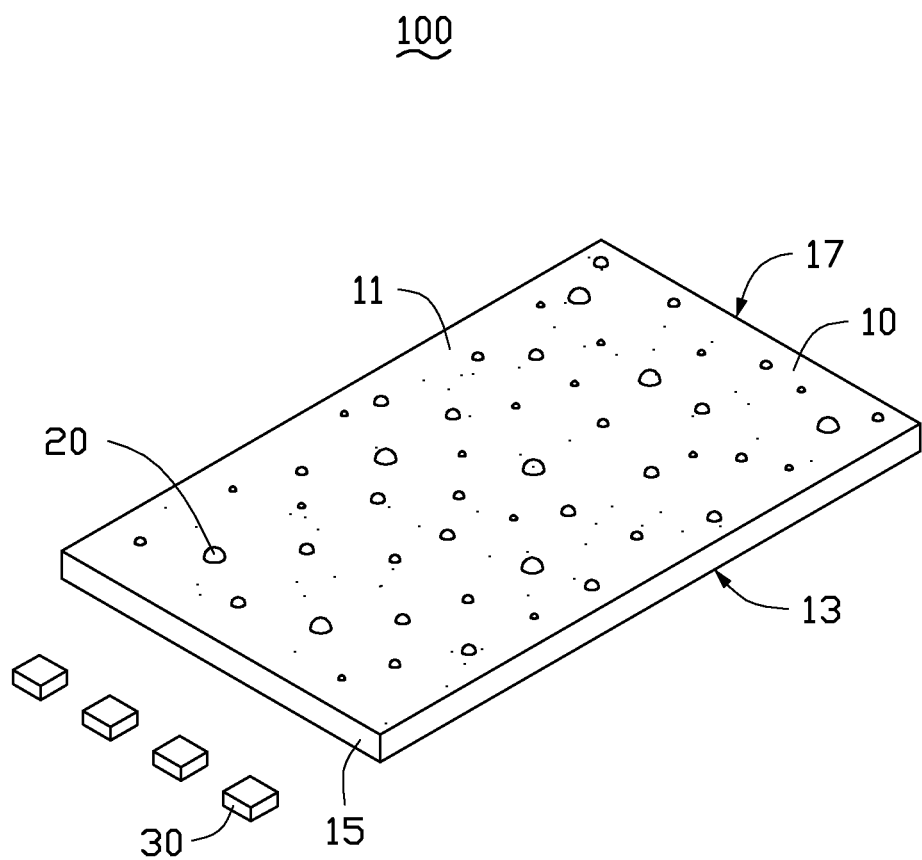
FIG. 1 is a schematic view of a light guide plate, according to an exemplary embodiment.

FIG. 1 illustrates a light guide plate 100 in accordance with an embodiment. The light guide plate 100 includes a main body 10 and a number of micro protrusions 20. In the embodiment, the micro protrusions 20 and the main body 10 are made of the same material.

The main body 10 is substantially cubic, and is made of transparent material (such as acrylic resin or polyethylene resin). The main body 10 includes a light emitting surface 11, a bottom surface 13, a light incident surface 15, and a side surface 17. The bottom surface 13 is opposite to and substantially parallel to the light emitting surface 11. The side surface 17 is opposite to and substantially parallel to the light incident surface 15. The light incident surface 15 is substantially perpendicular to the light emitting surface 11. In other embodiments, the bottom surface 13 can be inclined with respect to the light emitting surface 15.

A number of light sources 30 face the light incident surface 15, and emit light rays. The light incident surface 15 transmits the light rays into the light guide plate 100. The bottom surface 13 and the side surface 17 respectively internally reflect the light rays in the light guide plate 10. The light emitting surface 11 transmits a portion of the light rays incident thereon to the exterior above the light guide plate 100, and reflects the other portion of the light rays incident thereon back into the light guide plate 100.

Figure 2:
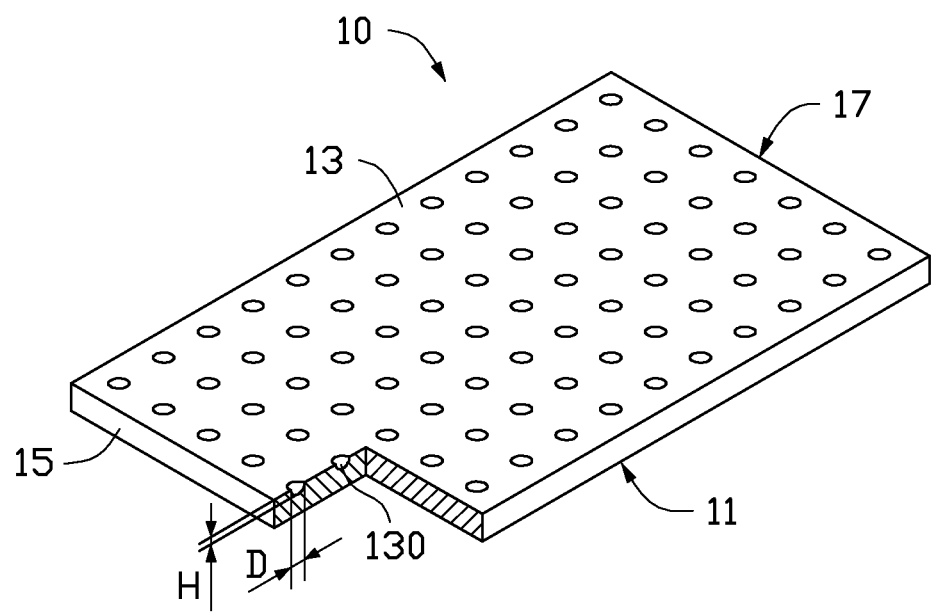
FIG. 2 is a cut-way view of the light guide plate of FIG. 1 from another angle.

Also referring to FIG. 2, the bottom surface 13 uniformly distributes a number of micro recesses 130. When the light rays transmitted in the light guide plate 100 arrive at the micro grooves 130, the light rays can be directly reflected by the surfaces of the micro grooves 130 directly to the light emitting surface 11. Thus the transmitting paths of the light rays in the light guide plate 100 are shorter, and the energy loss of the light rays is reduced. Accordingly, the light brightness of the light emitting surface 11 is greatly improved. In the embodiment, the micro recesses 130 are spherical crown-shaped, and are arranged in an array of rows and columns. A ratio of the diameter D of each micro recess 130 to the depth H of each micro recess 130 is about 10:1. In other embodiments, the micro recesses 130 also can be cylindrical or cubic, and are formed through a laser processing method.

The micro protrusions 20 are randomly positioned on the light emitting surface 11 The shapes and the areas of the micro protrusions 20 are randomly distributed, and thus the light rays transmitted in the light guide plate 100 can be randomly reflected towards different directions, and randomly reach different portions of the light emitting surface 11. Therefore, the densities of the light rays at different portions of the light emitting surface 11 are substantially equal as each other, and the brightness of the light emitting surface 11 is distributed uniformly. In the embodiment, the protrusions 20 are formed through a high pressure spraying method.

Figure 3:
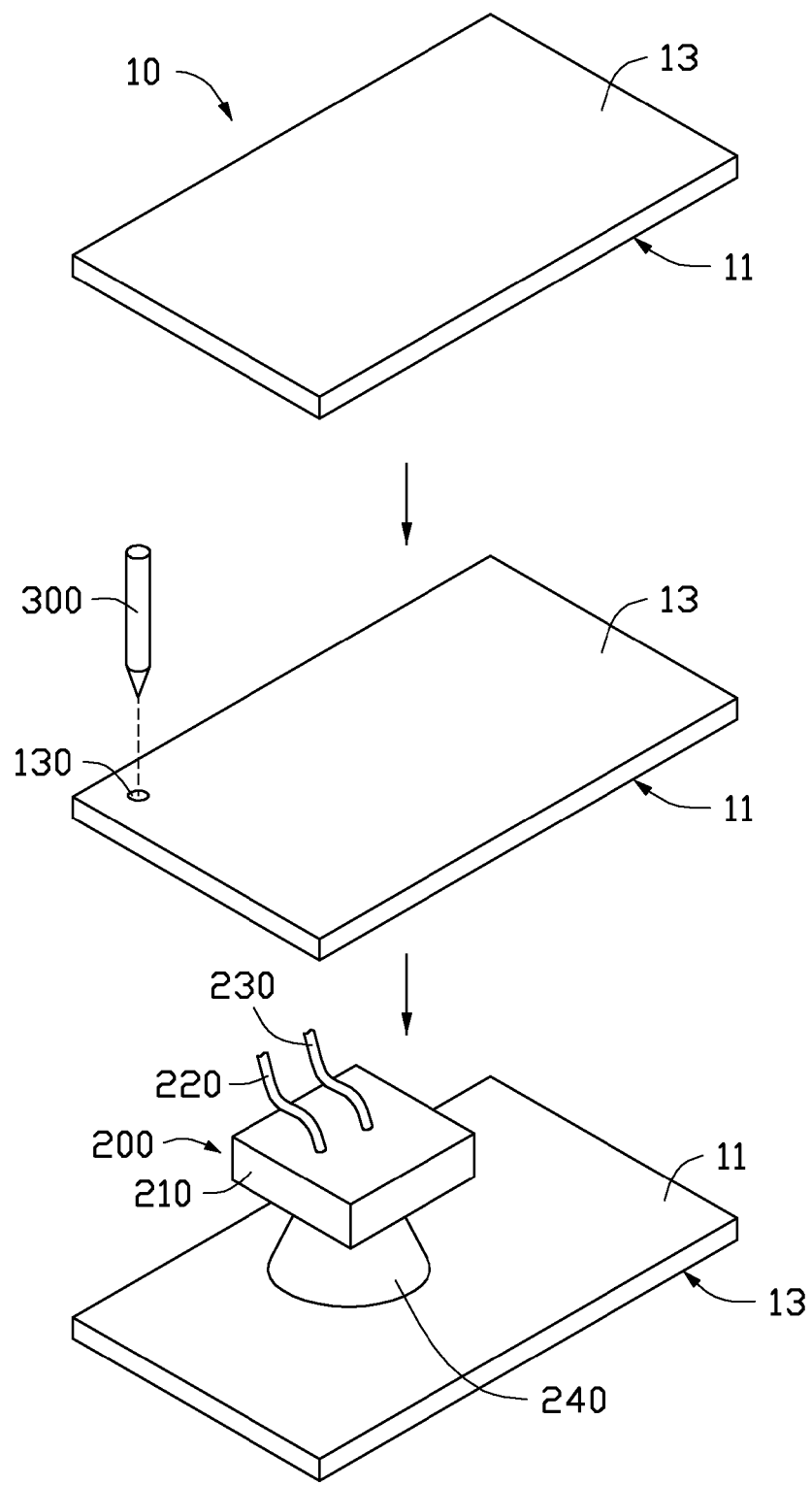
FIG. 3 is a schematic view of a method of manufacturing the light guide plate of FIG. 1.

FIG. 3 shows a method of manufacturing the light guide plate 100, and the method includes the following steps.

In step S1, a main body 10 is provided, and the main body 10 has a light emitting surface 11 and a bottom surface 13 opposite to the light emitting surface 11.

In step S2, a laser processing device 300 is provided, and a number of the micro recesses 130 are uniformly formed on the bottom surface 13 using the laser processing device 300. In this embodiment, the micro recesses 130 are spherical crown-shaped, and are arranged in an array of rows and columns.

In step S3, a high pressure spraying device 200 is provided, and a number of the micro protrusions 20 are randomly formed on the light emitting surface 11 using the high pressure spraying device 200. In particular, the high pressure spraying device 200 includes a hollow working container 210, a solvent inlet 220, a gas inlet 230, and a nozzle 240. The solvent inlet 220, the gas inlet 230, and the nozzle 240 communicate with the working container 210. A molten solvent is poured into the working container 210 through the solvent inlet 220. A high pressure gas enters into the working container 210 through the gas inlet 230. The nozzle 240 faces the light emitting surface 11, and is separated from the light emitting surface 11, and sprays the molten solvent on the light emitting surface 11 at a force of the high pressure gas, thus forming a number of micro protrusions 20 randomly. The shapes and the areas of the micro protrusion 20 are randomly formed. At last, the micro protrusions 20 are cooled to be attached to the light emitting surface 11, and thus the light guide plate 100 is obtained.

If a spraying area of the nozzle 240 is greater than the area of the light emitting surface 11, then the nozzle 240 does not move during the high pressure spraying process. If the spraying area of the nozzle 240 is less than the area of the light emitting surface 11, then the nozzle 240 needs to move during the high pressure spraying process to make the spraying area to cover the light emitting surface 11.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light guide plate, comprising:
   a transparent main body comprising:
      a light emitting surface;
      a bottom surface opposite to the light emitting surface, a plurality of micro recesses uniformly distributed on the bottom surface, the micro recesses being spherical crown shaped, a ratio of a diameter of each of the micro recesses to a depth of each of the micro recesses being about 10:1; and
      a light incident surface connecting the light emitting surface and the bottom surface; and
   a plurality of transparent micro protrusions randomly positioned on the light emitting surface, the micro protrusions being configured for reflecting light rays towards random directions.

2. The light guide plate of claim 1, wherein the main body and the micro protrusions are made of same materials.

3. The light guide plate of claim 1, wherein the micro protrusions are formed through high pressure spraying method.

4. The light guide plate of claim 1, wherein the micro recesses are arranged in an array of rows and columns.

5. A method of manufacturing a light guide plate, comprising:
   providing a main body, wherein the main body comprises a light emitting surface and a bottom surface opposite to the light emitting surface;
   providing a high pressure spraying device;
   forming a plurality of micro protrusions on the light emitting surface using the high pressure spraying device, wherein the high pressure spraying device comprises a hollow working container, a solvent inlet, a gas inlet, and a nozzle; a molten solvent is poured into the working container through the solvent inlet, and a high pressure gas enters the working container through the gas inlet, and then the solvent is sprayed to the light emitting surface at a force of the high pressure gas, and thus to randomly form the micro protrusions on the light emitting surface; and
   cooling the micro protrusions to attach the micro protrusions to the light emitting surface to obtain the light guide plate.

6. The method of claim 5, comprising: forming a plurality of micro recesses uniformly distributed on the bottom surface through laser processing method.

7. The method of claim 6, wherein the micro recesses are spherical crown shaped, a ratio of a diameter of each of the micro recesses to a depth of each of the micro recesses is about 10:1.

8. The method of claim 6, wherein the micro recesses are arranged in an array of rows and columns.

9. The method of claim 5, wherein a spraying area of the nozzle is greater than the area of the light emitting surface, then the nozzle is stationary relative to the light emitting surface during the high pressure spraying process.

10. The method of claim 5, wherein a spraying area of the nozzle is less than the area of the light emitting surface, the nozzle moves to make the spraying area cover the light emitting surface during the high pressure spraying process.

11. The method of claim 5, wherein the solvent and the protrusions are made of same materials.

* * * * *